United States Patent Office 3,158,254
Patented Nov. 24, 1964

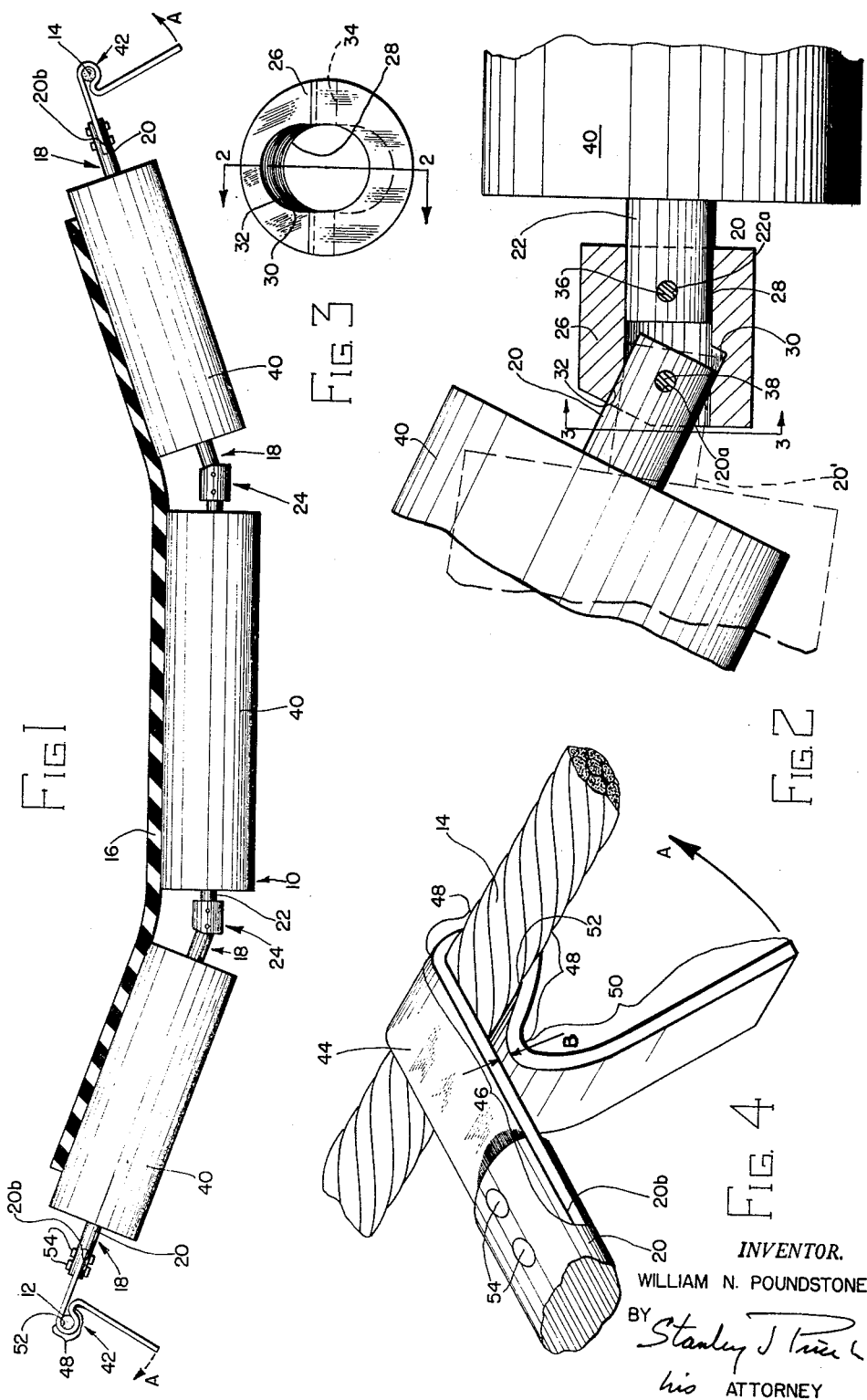

3,158,254
PREFORMED RESILIENT CLAMP FOR IDLER ROLLERS
William N. Poundstone, Morgantown, W. Va., assignor to Consolidation Coal Company, Pittsburgh, Pa., a corporation of Pennsylvania
Filed July 22, 1960, Ser. No. 44,693
3 Claims. (Cl. 198—192)

The present invention relates to a preformed resilient clamp, and more particularly to a clamp adapted to removably secure limited troughing idler roller assemblies to the flexible side frames of belt conveyors.

The conventional endless belt conveyor consists of a belt supported by a series of idler rollers. The belt is driven by a belt drive means. The belt has a troughed conveying reach supported in a general horizontal manner by a series of troughing idler rollers. The conveying reach carries the material to be transported by the conveyor belt. The conveyor belt has a return reach supported in a generally horizontal manner, usually below the conveying reach, by a series of return reach idler rollers. The return reach returns the empty portion of the belt to the belt drive means to form a continuous path for the endless conveyor belt.

In recent years belt conveyors have been constructed in which a pair of flexible side frames are trained along a conveying course to support the conveyor belt. The flexible side frames are usually formed of wire rope or cable or the like, and are supported at intervals by side frame supporting means such as vertical side frame supporting stands. The spaced side frames extend in a generally parallel manner along the conveying course. Idler rollers span the side frame members to support the conveying reach of the belt conveyor.

Flexible side frame belt conveyors have many advantages which make them popular in the mining industry. Among these advantages, flexible side frame conveyors are easily erected and disassembled for movement. Certain types of flexible side frame conveyors also provide an inherent belt training action which is valuable in belt conveyors.

In my copending U.S. patent application Serial No. 9,077 entitled "Troughing Idler Roller Assembly for Belt Conveyor" filed on February 16, 1960, now Patent No. 3,082,860, issued March 26, 1963, there is disclosed and claimed several species of troughing idler rollers that are particularly adapted for use with flexible side frame supported belt conveyors and which have trough limiting means. As fully disclosed in the aforesaid application, the idler roller assemblies permit deepening of the trough of the conveyor belt conveying reach under increased loading conditions up to a predetermined maximum trough depth. When the maximum trough depth is achieved, further troughing is precluded by limiting means which cause the idler roller assemblies to become rigid spans between the longitudinally extending flexible side frames. These limited depth troughing rollers permit the flexible side frames of the conveyor assembly to maintain the rollers in contact with the underside of the conveyor belt throughout the entire width of the conveyor belt under all loading conditions and, at the same time, prevent excessive belt troughing.

The present invention contemplates a novel, resilient clamp which is formed from a single piece of resilient material such as spring steel or the like. The clamp of the present invention is particularly suited for securing limited troughing idler roller assemblies to the flexible side frames of belt conveyors although, of course, its use is not limited to only that function. In the detailed description to follow, the novel clamp of the present invention will be described as securing a limited troughing idler roller assembly to the respective flexible side frames of a belt conveyor. The limited troughing idler roller assembly to be described in detail is similar to that disclosed in FIGURES 1, 2 and 3 of my aforesaid copending application. The idler roller assembly herein described functions in the same manner as the roller assembly disclosed in connection with FIGURES 1, 2 and 3 of the copending application.

In its preferred embodiment, the clamp of the present invention is a self-tightening clamp formed from a single piece of resilient material such as spring steel or the like. When utilized at each end of the shaft member of a troughing idler roller assembly, the clamp of the present invention permits ready assembly and disassembly of the flexible side frame supported belt conveyor in that the transversely extending roller assemblies may be placed upon and removed from the flexible side frame members with a minimum of effort. While permitting ready assembly and disassembly, the clamps of the present invention are self-tightening. When an additional load is conveyed by the belt conveying reach, the force resulting from this load is transferred through the roller assembly and into the clamp. The clamp is so constructed that the increased force causes it to more tightly engage the flexible side frame member and prevent movement of the roller assemblies longitudinally relative to the flexible side frame members.

With the foregoing considerations in mind, it is a primary object of the present invention to provide an improved resilient clamp.

Another object of this invention is to provide a clamp particularly adapted to clamp limited troughing idler roller assemblies to flexible side frames of belt conveyors.

Another object of this invention is to provide a novel combination of a clamp and a limited troughing idler roller assembly which combination may be utilized to quickly erect belt conveyors.

Another object of this invention is to provide a self-tightening clamp which engages a flexible strand more forcefully when a load is placed upon the clamp.

Another object of this invention is to provide a preformed clamp which is readily fabricated from a single piece of resilient material.

These and other objectives achieved by the present invention will become apparent as this description proceeds in conjunction with the accompanying drawings.

In the drawings:

FIGURE 1 is an elevational view of a limited troughing idler roller assembly secured to a pair of longitudinally extending flexible side frame members by the clamps of the present invention.

FIGURE 2 is an enlarged sectional view of the hinged construction of the roller assembly of FIGURE 1 showing the relative positions of adjacent roller members.

FIGURE 3 is an end view of the hinged body member of FIGURE 2 as viewed from line 3—3 of FIGURE 2.

FIGURE 4 is an enlarged perspective view of one of the clamps shown in FIGURE 1.

Referring to the drawings, there is shown an idler roller assembly 10 extending laterally between two longitudinally extending flexible side frame members 12 and 14. The flexible side frame members 12 and 14 are constructed of wire rope or cable or the like and are trained along a conveying course and supported by vertical supporting standards (not shown). The troughed conveying reach 16 of an endless conveyor belt is positioned in generally parallel relation to the side frame members 12 and 14 and is supported by a plurality of idler roller assemblies 10 throughout its length.

The shaft member 18 of the idler roller assembly 10 is formed from a pair of rigid shaft member end sections 20 and a rigid shaft member center section 22 which are hingedly joined together by hinge assemblies 24. Each hinge assembly 24 has a generally cylindrical hinged body member 26 that has a longitudinal cylindrical bore 28 formed therein. An angled bore 30 is formed in hinged body member 26 to intersect with longitudinal cylindrical bore 28 at a predetermined obtuse angle. Bores 28 and 30 are of such diameter that they will readily receive the shaft member end sections 20 and the shaft member center section 22 therein. The obtuse angle at which bores 28 and 30 intersect within the hinged body member 26 fixes the maximum trough depth which may be achieved by the idler roller assembly 10 in a manner to be described. Bore 30 has an internal cylindrical surface 32 which serves as a trough limiting stop.

The hinge body member 26 has a pair of transverse bores 34 formed therein and aligned with the axis of longitudinal cylindrical bore 28. In assembling the roller assembly 10, one end of the shaft member center section 22 is placed within the longitudinal cylindrical bore 28 of hinge body member 26 and a roll pin is inserted through the hinge body member 26 in one of the transverse bores 34 and through a bore 22a that is formed within shaft member center section 22. The end of a shaft member end section 20 is inserted within the angled bore 30 of hinge body member 26 and a roll pin 38 is inserted through one of the transverse bores 34 in hinge body member 26 and through the aligned bore 20a formed in shaft member end section 20 to pivotally secure the shaft member end section 20 within the hinge body member 26. A rigid cylindrical roller member 40 is rotatably supported by each of the shaft member end sections 20 and the shaft member center section 22. The rigid cylindrical roller members 40 support the troughed conveying reach 16 of the endless conveyor belt.

Each shaft member end section 20 is secured to a respective adjacent flexible side frame member 12 and 14 by a resilient clamp 42. As is best seen in FIGURE 4, clamp 42 is formed from a single, flat, resilient member 44.

The resilient member 44 is preformed to have a straight shank portion 46 that terminates in an intermediate bight portion 48 that is generally cylindrical in shape and that, in turn, terminates in a handle portion 50. The bight portion 48 has a cylindrical internal surface 52. Cylindrical internal surface 52 of bight portion 48 conforms generally to the generally cylindrical external surfaces of flexible side frame members 12 and 14.

The shaft member end sections 20 have longitudinal slots 20b formed therein adjacent the respective flexible side frame members 12 and 14. The shank portions 46 of clamps 42 are inserted in slots 20b of the shaft member end sections and the clamps 42 are riveted to the end sections 20 by rivets 54. It will be appreciated that any suitable fastening means which rigidly connects the clamp shank portion 46 to the shaft member end portions 20 may be utilized. Clamps 42 may be, for example, welded to the shaft member end portions 20.

The clamps 42 are preformed for a particular size flexible side frame member. The bight portion 48 of each clamp is so shaped that the radius of the internal cylindrical surface 52 of bight portion 48 is less than the radius of the external, generally cylindrical surface of the flexible side frame member when the clamp resilient member 44 is in a relaxed condition. The bight portion 48 also creates more than 180° of direction change in the resilient member 44. That is, when the bight portion 48 is disposed over a flexible side frame member 12 or 14, the cylindrical internal surface 52 of bight portion 48 contacts the generally cylindrical external surface of the flexible side frame member over more than one half the circumference of the respective cylindrical surface.

The bight portion 48 is curled around and back into proximity with the clamp shank portion 46. The clamp handle portion 50 then extends outwardly in substantially normal relation to the shank portion 46. The opening between the shank portion 46 and the normally extending handle portion 50 indicated by "B" on FIGURE 4 is substantially less than the diameter of the respective flexible side frame member 12 or 14 to be clamped.

In erecting a flexible side frame belt conveyor, the flexible side frame members 12 and 14 are trained longitudinally along a belt conveying course and supported by appropriate vertical supporting standards (not shown). The troughing idler roller assemblies 10 are then secured laterally across the flexible side frame members to span the distance between longitudinally extending, parallel side frame members.

To secure the idler roller assemblies 10 to the flexible side frame members 12 and 14, the shaft member end portions 20 are pivoted about the roll pin 38 within the hinge member body portion 26. The shaft member end portions 20 are pivoted so that the obtuse angle between the respective end sections 20 and the shaft member center section 22 is at a minimum. This minimum angle condition occurs when the shaft member end section 20 abuts the cylindrical internal surface 32 of the angled bore 30 in hinge body member 26. This position is shown in the full line drawing of FIGURE 2.

The roller assembly 10 is then positioned laterally across the longitudinally extending flexible side frame members 12 and 14 and the handle portions 50 of the clamps 42 are grasped. The handle portions 50 are urged upwardly and away from each other in the direction indicated by arrows A on FIGURE 1 and FIGURE 4 to open the bight portion 48 of the resilient member 44 of each clamp 42. This movement of handle portion 50 causes the effective radius of the internal cylindrical surface 52 of bight portion 48 to be increased. The bight portion 48 of each clamp 42 may then be slipped over the respective flexible side frame member 12 or 14. When these handle portions 50 are released, the natural resilience of member 44 causes the bight portion 48 to relax and clamp the internal cylindrical surface 52 of the bight portion in engaging contact with the generally cylindrical external surface of the respective flexible side frame members 12 and 14.

Once the roller assembly is in position on the flexible side frame members 12 and 14, and the belt conveyor is operating, the hinges 24 permit the trough depth of the belt conveyor troughed conveying reach to vary. When the conveying reach is lightly loaded, the tension in flexible side frame members 12 and 14 will draw the ends of the roller assembly 10 away from each other and the shaft member center section 22 will be raised and the obtuse angles between the shaft member center section 22 and the respective end sections 20 will be increased. The phantom line position 20' of the shaft member end section and the phantom line position 40' of the rigid cylindrical roller member shown in FIGURE 2 indicates the relative positions of the end sections 20 and center section 22 when the conveyor belt trough conveying reach is relatively lightly loaded and the tension of the flexible side frame members 12 and 14 pulls the ends of the roller assembly 10 away from each other. When the belt conveying reach 16 is heavily loaded, the shaft member center section 22 is forced downwardly and longitudinally extending flexible side frame members 12 and 14 are drawn laterally toward each other to shorten the distance which roller assemblies 10 must span. The depth of the trough is limited, however, by the engagement of the shaft member end sections 20 with the respective internal cylindrical surfaces 32 of angled bore 30 in the hinge body member 26. Once the end sections 20 abut the cylindrical internal surfaces 32 within hinge body member 26, the depth of the trough of conveying reach 16 may not be further increased and the shaft member 18 then becomes a rigid member between the longitudinally extending flexible side frames 12 and 14.

When the load on the trough conveying reach 16 is relatively heavy, tension is exerted on the shank portion 46 of the clamps 42. This tension causes the flexible side frame members 12 and 14 to be urged laterally toward each other. Since the cylindrical internal surface 52 of the bight portion 48 of clamps 42 contacts the external surface of the flexible side frame members 12 and 14, the frictional contact between the bight portion 48 and the respective flexible side frame member prevents relative rotation of the flexible side frame member within the clamp bight portion 48. Thus, the tension exerted on shank portion 46 causes the bight portion 48 of the clamp 42 to be closed so that the bight portion more forcefully engages the flexible side frame member 14.

When the belt conveying reach 16 is heavily loaded, there is a tendency for the roller assemblies 10 to move longitudinally and slide along the flexible side frame members 14.

When the belt conveying reach 16 is heavily loaded, there is a tendency for the roller assemblies 10 to move longitudinally and slide along the flexible side frame members 12 and 14. Because of the self-tightening characteristics of the clamps 42, the bight portion 48 of the clamps more forcefully engages the flexible side frame members 12 and 14 and prevents this longitudinal movement of the roller assemblies 10.

When it becomes necessary to relocate the endless belt conveyor, the conveyor may be readily disassembled since the idler roller assemblies 10 can be quickly removed from the flexible side frame members 12 and 14. To remove the roller assemblies 10, handle portion 50 of the respective clamps 42 are grasped and urged outwardly and upwardly in the directions of arrows "A" on FIGURES 1 and 4 so that the bight of the resilient member 44 is increased. The bight portion 48 of the clamps may then be readily slipped off the flexible side frame members 12 and 14.

According to the provisions of the patent statutes, I have explained the principle, preferred construction, and mode of operation of my invention and have described what I now consider to represent its best embodiment. However, I desire to have it understood that, within the scope of the appended claims, the invention may be practiced otherwise than as specifically illustrated and described.

I claim:

1. In a flexible side frame supported endless belt conveyor having spaced, flexible side frame members extending longitudinally along a conveying course, an endless conveyor belt having a troughed conveying reach supported between said side frame members for movement along said conveying course, a troughing idler roller assembly adapted to support said conveyor belt troughed conveying reach, said idler roller assembly including a shaft member transversely spanning said side frame members, said shaft member having end portions secured to each of said side frame members, said shaft member including means to permit deepening of said conveyor belt conveying reach trough by permitting said side frame members to be drawn toward each other, a plurality of roller members supported by said shaft member and supporting said troughed conveying reach, and said shaft member including limiting means to limit the depth of said conveying reach trough by inhibiting the movement of said side frame members toward each other at a minimum distance from each other, the improvement comprising a resilient clamp for securing each of said shaft member end portions to one of said side frame members, said clamp including a preformed resilient member having a shank end portion, an intermediate bight portion and a handle portion, securing means to permanently secure said shank end portion to said respective shaft end portion, said bight portion being preformed to have in internal surface that conforms generally to the external surface of said respective side frame member, said handle portion being effective upon movement away from said shank end portion to distort said preformed resilient member so that said bight portion internal surface may be positioned in engaging relation over said respective side frame member external surface, said handle portion being so constructed and arranged that when said handle portion is raised upwardly and axially outwardly relative to said shaft member said handle portion is moved away from said shank end portion, said resilient member being so preformed that, when relaxed, said bight portion internal surface clampingly engages and frictionally contacts said respective side frame member external surface.

2. A troughing idler roller assembly comprising a shaft member transversely spanning a pair of longitudinally extending, spaced flexible side frame members each having generally cylindrical external surfaces, said shaft member having end portions each removably secured to one of said side frame members by a clamp, each of said clamps including a preformed resilient member having a shank end portion, an intermediate bight portion and a handle portion, securing means to secure each of said clamps to said respective shaft member end portion, said bight portion being generally cylindrical and having a cylindrical internal surface with a relaxed internal radius less than the radius of said respective flexible side frame member external surface whereby said bight portion may clampingly engage said flexible side frame member external surface, said handle portion being effective upon movement away from said shank end portion to distort said preformed resilient member and increase the effective radius of said bight portion internal surface to permit said bight portion cylindrical internal surface to be positioned in engaging relation over said respective flexible side frame member external surface, said shaft member including means to permit deepening the trough of said idler roller by permitting said side frame members to be drawn laterally toward each other, a plurality of roller members supported by said shaft member, and said shaft member including limiting means to limit the depth of said idler roller trough by inhibiting the movement of said side frame members toward each other at a minimum distance from each other.

3. A troughing idler roller assembly comprising a shaft member transversely spanning a pair of longitudinally extending, spaced flexible side frame members each having generally cylindrical external surfaces, said shaft member having end portions each removably secured to one of said side frame members by a self-tightening clamp, each of said clamps including a preformed resilient member having a shank end portion, an intermediate bight portion, and a handle portion, securing means to permanently secure each of said clamps to said respective shaft member end portion, said bight portion being generally cylindrical and having a cylindrical internal surface with a relaxed internal radius less than the radius of said respective flexible side frame member external surface whereby said bight portion may clampingly engage said flexible side frame member external surface, said handle portion positioned to extend from said bight portion generally normal to said shank portion and said handle portion adjacent said bight portion being spaced from said shank portion a distance substantially less than the diameter of said respective flexible side frame member when said resilient member is in the relaxed position, said handle portion being effective upon movement away from said shank end portion to distort said preformed resilient member so that said bight portion cylindrical internal surface may be positioned in engaging relation over said respective side frame member external surface, said bight portion internal surface being in engagement with said respective side frame member external surface over more than one half the circumference of said side frame member external surface, said resilient member being so proportioned that when an axial force is exerted on said shank portion in a direction away from said bight portion, the effective radius of said bight portion cylindrical internal surface is reduced causing said bight portion cylindrical internal surface to tighten around said respective side frame member external surface, said shaft member including means to permit deepening of said idler roller trough by permitting said side frame members to be drawn toward each other, a plurality of cylindrical roller members having their cylindrical axes coincident with said roller member being supported by said shaft member, said shaft member including limiting means confined within the radial limits of the cylindrical surfaces of said roller members to limit the depth of said idler roller trough by inhibiting the movement of said side frame members toward each other at a minimum distance from each other.

References Cited in the file of this patent
UNITED STATES PATENTS

| | | |
|---|---|---|
| 582,927 | Johnson | May 18, 1897 |
| 1,358,815 | Barrell | Nov. 16, 1920 |
| 2,195,967 | Liebmann | Apr. 2, 1940 |
| 2,776,044 | Lo Presti | Jan. 1, 1957 |
| 2,885,066 | Lo Presti | May 5, 1959 |
| 2,889,918 | Bergmann | June 9, 1959 |
| 2,966,255 | Gleeson | Dec. 27, 1960 |